(No Model.)
S. T. SHORTESS.
DEVICE FOR OVERCOMING DEAD CENTERS.
No. 366,433. Patented July 12, 1887.
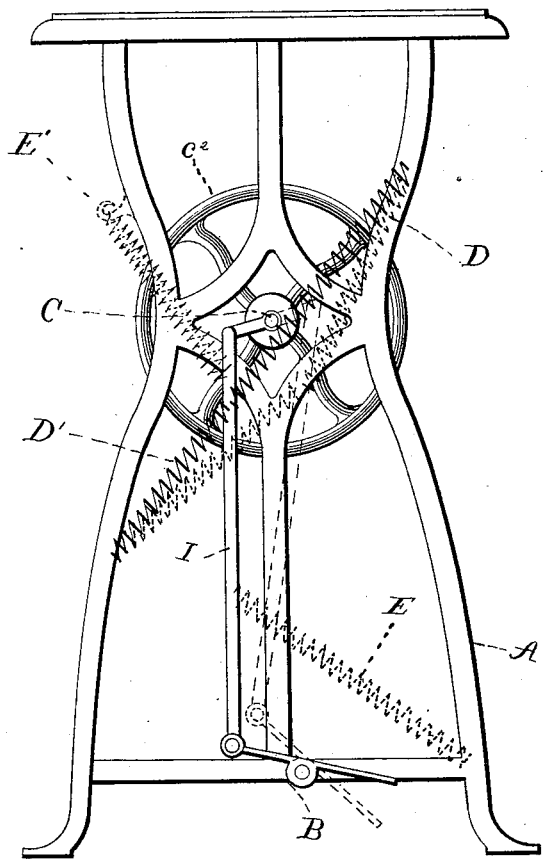
WITNESSES
St. A. Clark
P. B. Turpin
INVENTOR
Stephen T. Shortess
By R. S. & A. P. Lacey
Attys

UNITED STATES PATENT OFFICE.

STEPHEN T. SHORTESS, OF VINTON, IOWA.

DEVICE FOR OVERCOMING DEAD-CENTERS.

SPECIFICATION forming part of Letters Patent No. 366,433, dated July 12, 1887.

Application filed June 7, 1884. Serial No. 134,185. (No model.)

*To all whom it may concern:*

Be it known that I, STEPHEN T. SHORTESS, a citizen of the United States, residing at Vinton, in the county of Benton and State of Iowa, have invented certain new and useful Improvements in Devices for Overcoming Dead-Centers; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention relates to devices for overcoming dead-centers, and has for its object to produce simple, compact, and efficient means to carry the crank or cranks of machinery past their dead-points without any jar or jolt of the same, thus producing a steady motion of such crank or cranks during the complete revolution of the same.

The improvement consists in having two coil-springs arranged upon opposite sides of the pitman in substantially parallel lines and having their inner ends connected with the pitman and their outer ends fastened to the framing of the machine in different horizontal planes, whereby one spring acts to carry the crank past one of its dead-points and the other spring carries the crank past the other dead-point, and each spring serves as a cushion for the other alternately, as will be more fully hereinafter set forth.

In the drawing, which shows the springs applied in two different ways, A is the frame of the machine, B the treadle, C the crank-shaft, C² the fly-wheel, and I the pitman connecting the crank-shaft with the treadle, all of which are of ordinary and well-known construction and arrangement, and are simply shown as a means for carrying out my invention.

The coil-springs D and D', two in number, one upon each side of the pitman, have their inner ends connected with the pitman and their outer ends extended in opposite directions and secured to the frame at different horizontal planes, so that the springs will be approximately in the same or parallel lines, which latter is shown by the dotted lines. The springs thus disposed are arranged to normally hold the crank off a dead-point, and in operation, as the crank nears its dead-point, one spring is compressed and the other spring is distended sufficiently to carry the crank past such dead-point, but not with a jerk, as the force brought to bear is equalized between the two springs.

While the springs D and D' are shown arranged in the same line and diagonally across the frame in one position, it is evident that they may be located in different parallel lines and arranged in a diagonally-opposite direction, as shown by the dotted lines E and E'.

I do not wish to confine myself only to the points of attachment of the springs, nor to the form of springs shown and described; but

What I claim as new, and desire to secure by Letters Patent, is—

The combination, with the crank-shaft and the pitman, of two springs arranged on approximately parallel lines and on opposite sides of and having their inner ends connected to the pitman, and having their outer ends secured to the framing in different horizontal planes, substantially as and for the purposes set forth.

In testimony whereof I affix my signature in presence of two witnesses.

STEPHEN T. SHORTESS.

Witnesses:
 W. P. WHIPPLE,
 H. E. WARNER.